United States Patent

[11] 3,614,617

[72] Inventor Bernard S. Blake, Jr.
515 Glencoe Road S.E., Huntsville, Ala. 35802
[21] Appl. No. 878,609
[22] Filed Nov. 21, 1969
[45] Patented Oct. 19, 1971

[54] DIGITAL INSTRUMENTATION SYSTEM FOR MOTOR VEHICLES
2 Claims, 4 Drawing Figs.

[52] U.S. Cl. ................................................ 324/166, 73/117.2, 324/171
[51] Int. Cl. .................................................. G01p 3/54
[50] Field of Search ................................... 324/173–175, 166–171; 73/116–118, 113, 114, 313; 235/150.2, 150.21, 151.32, 92 DN, 92 F, 92 TF

[56] References Cited
UNITED STATES PATENTS
3,525,044  8/1970  Richmond ................... 324/173
FOREIGN PATENTS
968,008  8/1964  Great Britain ................ 324/171

Primary Examiner—Michael J. Lynch
Attorney—James H. Littlepage

ABSTRACT: A transducer magnetically coupled to a vehicle's drive system produces pulses corresponding to the vehicle's wheel rotation. The pulses are fed to a preset counter which provides one output pulse per each predetermined number of input pulses, and the output pulses from the preset counter are counted to give an indication of mileage. Pulses from the transducer are also fed to a logic system to provide an indication of speed. Analog signals are also fed to the logic system to measure and provide indications of other vehicle functions.

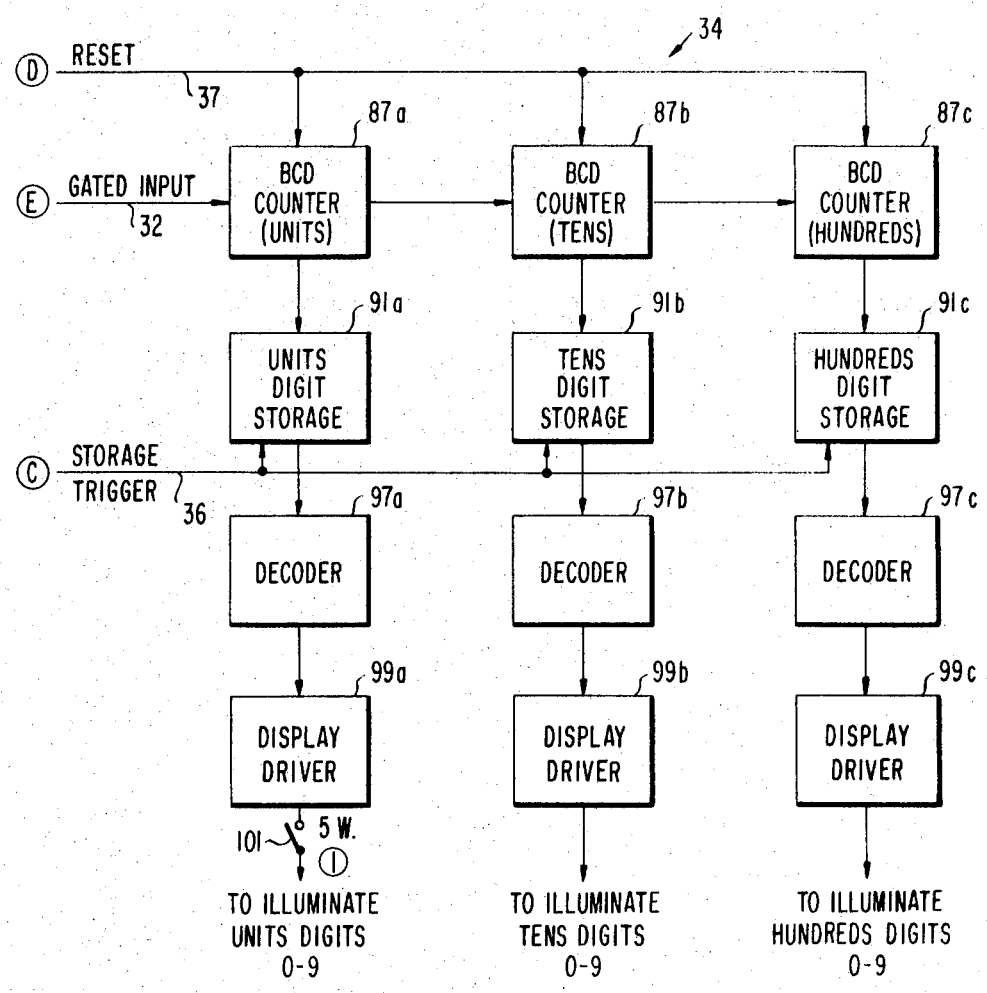

DIGITAL INSTRUMENTATION SYSTEM FOR MOTOR VEHICLES

FIELD OF INVENTION

Electricity, Measuring And Testing, Time And/Or Speed, With Event Sensing Means.

PRIOR ART

Campani U.S. Pat. No. 2,533,091; strong U.S. Pat. No. 2,701,097; Maschke U.S. Pat. No. 3,168,245; Hin Hung Ho et al. U.S. Pat. No. 3,396,333.

OBJECTS

The primary object of this invention is to provide a digital instrumentation system which is not only sufficiently versatile as to provide a vehicle operator with information as to a number of performance and status characteristics, such as speed and mileage, but which also is adaptable, by means of simple adjustments, to vehicles of various size, and which can also be adjusted to compensate for change in wheel or tire size.

Another object is to provide a digital instrumentation system by means of which various other conditions, such as fuel level, can be easily and accurately measured, all with a single digital readout. By this means, it is possible to get information about a number of functions of a vehicle in digital form from a single readout instrument, thereby avoiding the necessity of a large number of dials or indicators.

These and other objectives will be apparent from the following specification and drawing, in which:

FIG. 3 is a block diagram of the counters, decoders and drivers; and

Figure 4:
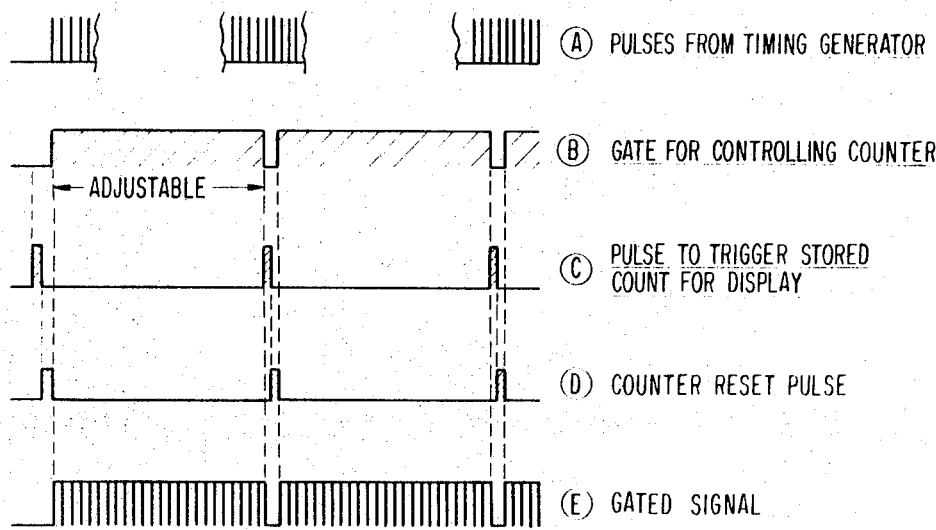

FIG. 4 is a timing diagram for the input and counter control logic and switching circuits. Referring now to the block diagram of FIG. 1, there is shown a pulse transducer 2 which, it will be understood, is actuated by a ferrous metal protrusion (such as a gear tooth) on a wheel or other part of the vehicle which rotates according to the speed of the vehicle along a roadway. For example, a gear tooth on the rotating part of the vehicle passes by transducer 2 with each rotation of a vehicle wheel, and the pulse output 4 of transducer 2 is fed to a pulse forming network 6 where it is formed, shaped and, if necessary, amplified. Part of the output 8 of pulse forming network 6 is fed to a preset pulse counter 10 which is adjustable to produced an output signal and to recycle upon the accumulation of pulses corresponding to a predetermined distance, such as 0.1 miles. This being a preset counter, it is possible to compensate for variations in wheel size from vehicle to vehicle, or for variation in tire size on the same vehicle. For example, a snow tire is generally larger than an ordinary tire, and a snow tire undergoes less revolutions per mile than an ordinary tire. By changing the number of pulses which are preset into counter 10, this difference in tire size can be easily compensated for. The output 12 from preset counter 10 is fed to an impulse counter driver 14 whose output 16 is fed to a total miles impulse counter 18.

Another portion of the output 8 of pulse forming network 6 is fed via a switch point 20 and switch 22 to speed input 24 of input and counter control logic and switching circuits 26. A timing generator 28 has an output 30 through which pulses at a predetermined fixed rate are continuously fed into input and counter control logic and switching circuits 26. Assuming the latter has been conditioned to provide a signal indicative of vehicle speed, it compares the rate of pulses derived from pulse forming network 6 with the rate of pulses derived from timing generator 28, and this provides a speed representative code signal at input 32 for unit 34 which contains counters, decoders, and drivers. Assuming a control signal input at 36 conditions unit 34 to be gated, triggered and reset in the proper time sequence, the latter feeds a signal via its output 38 which is representative of speed which is indicated in an illuminated digital display 40. In this example, it will be assumed that unit 34 produces a digitally coded voltage in output 38 which is proportional to the speed signal derived via input 32 from input and counter control logic and switching circuits 26, and in such case illuminated digital display 40 would be a digital indicating frequency meter.

To drive the various units there is a power supply 42 which obtains electrical power from the vehicle's power supply line 44. Power supply 42, via logic supply channel 46, feeds power to the various logic units. It also has a regulator 48 which feeds the closely regulated voltage to other units in the vehicle whose performance is to be measured. For example, a closely regulated voltage is fed via output lines 50, 52 across the potentiometer 54 of fuel level transducer 55. It will be assumed that the slider of potentiometer 54 is moved by a float or other element in the vehicle's fuel tank according to the level of fuel in the tank. A voltage proportional to the fuel level is fed via run contact 56 of switch 58 to a voltage to frequency converter 60, which has an output 62 which, in this example, feeds a signal into input and counter control logic and switching circuit unit 26. This, of course, is a digital signal comprising pulses which vary in frequency according to fuel level. For purposes of calibration, a regulated voltage may be derived from voltage regulator 48 via switch point 64. The voltage to frequency converter 60 can easily be calibrated for variations in the sizes of fuel tanks from vehicle to vehicle, or changes in the characteristics of the fuel level sensing device of a vehicle. Voltages representative of other measurements can be derived from other portions of the vehicle, as by optional measurement input line 65 which can be connected via switch point 66 and switch 58 and into voltage to frequency converter 60. For example, a suitable sensing unit which provides an analog voltage proportional to oil temperature can be fed into voltage to frequency converter 60 which will thereupon produce a digital signal which varies in frequency in accordance with oil temperature, and the frequency of this signal is compared in unit 26 with the frequency output of timing generator 28. Obviously, input and counter control logic and switching circuits 26 and the counters, decoders and drivers units 34 must be controlled according to the desired vehicle function to be displayed in unit 40. For this purpose a suitable operator's measurement selector switch 68 which obtains a suitable control signal from source 70 can be closed when it is desired to obtain a reading of fuel level in unit 40. Timing generator 28 has a timing output 72 to optional equipment so that pulses at a fixed rate can be fed to other measuring equipment on the vehicle or, for example, to a clock. Also, to calibrate the speed measurement, timing generator 28 is provided with an output 74 which can be fed via switch point 76 and switch 22 to speed input 24 of the input and counter control logic and switching circuits 26.

Figure 2:
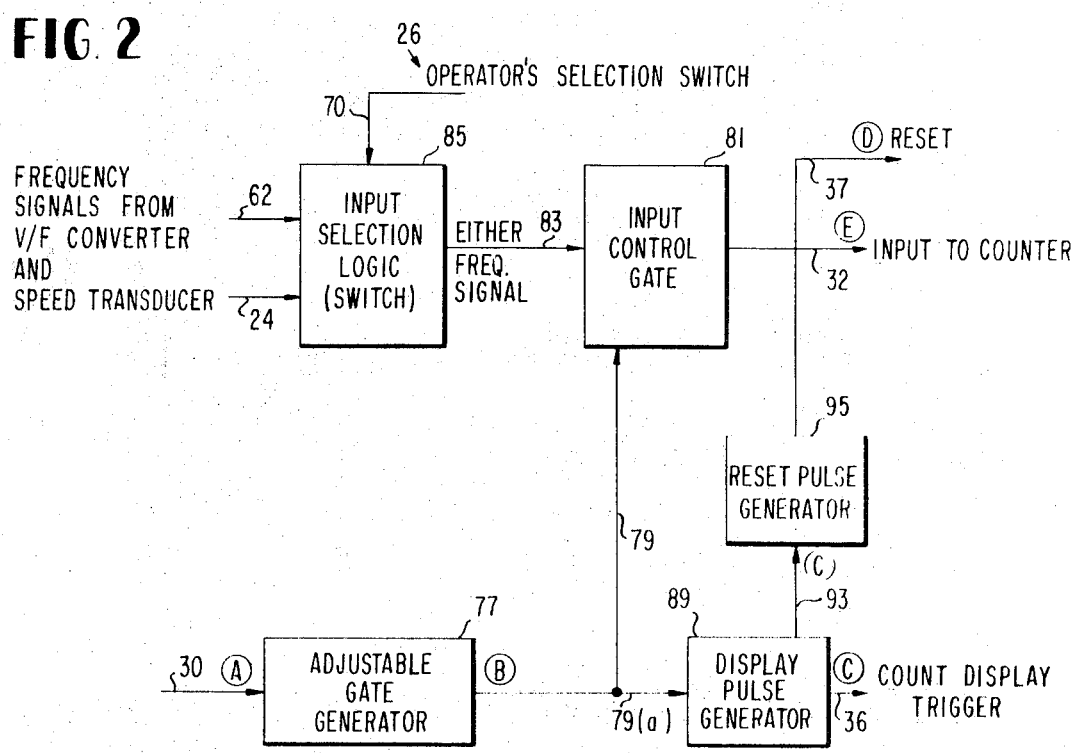
FIG. 2 is a block diagram of the input and counter control logic and switching circuits.

Referring now to FIG. 2, the pulses A from timing generator 28 are used to trigger an adjustable gate generator 77. For example, the timing generator may operate at 1 kHz., and the gate pulse width B may be adjustable around one second. The adjustability of the gate is to accommodate various wheel and tire sizes. Part of the output 79 (signal B) from adjustable gate generator 77 is fed to an input control gate 81 where is modulates or gates whichever frequency signal in channel 83 (i.e., from the V/F converter 60 or from pulse forming network 6) has been selected by means of the input selection logic 85 selector switch 68. This gated signal E is fed to the counter 87a, 87b, 87c via input 32 in order to count the number of pulses that occur in each gate time.

Signal B is also fed via input 79a to display pulse generator 89 so that it can produce a short pulse C which performs two functions. First, it passes via input 36 to trigger out of the counter's storage logic 91a, 91b, 91c the count that has accumulated during the gated period. This is so that the illuminated digital measurement display 40 shows only the final count and not all the individual changes. Second, pulses C are fed via input 93 so as to trigger reset pulse generator 95 which produces a short pulse D, which is fed via output 37 to BCD counters 87a, 87b, 87c. This pulse, occurring immediately after the count is displayed, resets all the counters so that the signal pulses may be counted after the next gated period.

Figure 1:
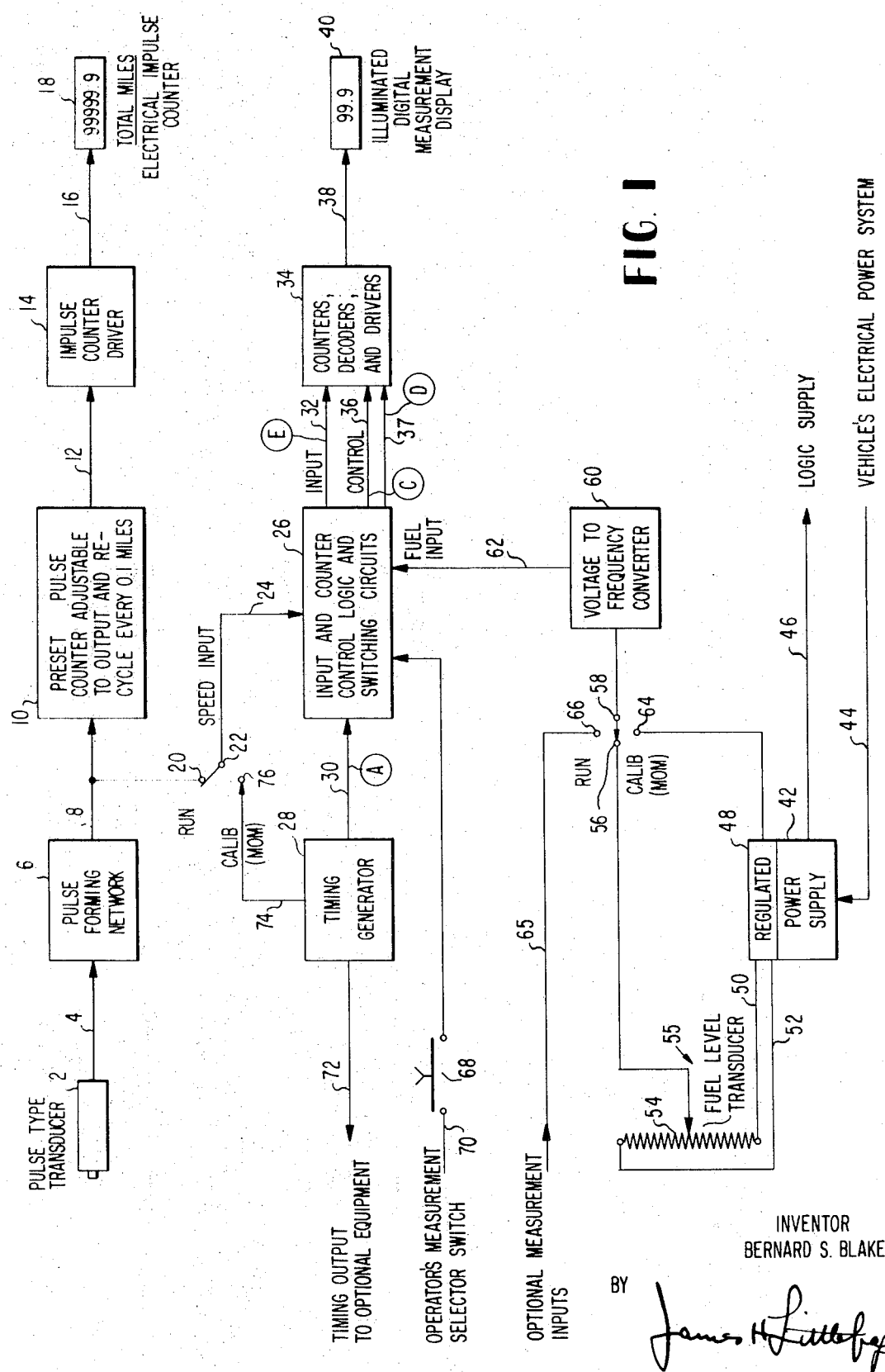
FIG. 1 is a block diagram of the entire system.

Referring now to FIG. 3, all the inputs to this block were described in connection with FIGS. 1 and 2. The gated input E is fed to the units BCD counter 87a. When the counter reaches a count of 10 it causes the tens BCD counter 87b to count 1, and when the latter reaches a count of 10 it causes the hundreds BCD counter 87c to count 1. Thus, the three decades can count up to 999. Each counter has a storage logic 91a, 91b or 91c that stores for display the previous count until the next storage trigger pulse C occurs. Decoders 97a, 97b, 97c are necessary to change the binary count to a decimal count. Display drivers 99a, 99b, 99c provide voltage transformations to drive the particular type of illuminated display number that is selected. The switch 101, is ganged with operator's selector switch 68 in such a way that when speed is measured only two digits are displayed, representing 0 to 99 miles per hours in 1 m.p.h. increments. When other measurements are made, switch 101 is closed and three digits are used to provide more accurate displays. For example, fuel would be displayed as 15.6 gallons.

In operation, it will be assumed that speed input switch 22 is switched to run contact 20. The rate of pulses from timing generator 28 will be compared to the rate of pulses from the pulse forming network 6 in input and counter control logic and switching circuits 26. Control 36 will condition counters, decoders and drivers 34 to produce a digitally coded voltage in output 38 proportional to speed which will be displayed in digital form in illuminated digital display 40. Simultaneously the total miles electrical impulse counter 18 will be accumulating a count indicative of total miles. If an indication of fuel level is desired, switch 68 is closed, whereupon in unit 26 the pulse output from voltage to frequency converter 60 will be compared with the pulse output from timing generator 28. Counters, decoders and drivers 34 will be conditioned then to provide a digitally coded voltage in output 38 which is proportional to fuel level, and this latter will be indicated in illuminated digital measurement display 40. Obviously, if this capacity of the fuel tank is 20 gallons, the units 26 and 34 will cooperate to produce in output 38 a digitally coded voltage which will vary according to fuel level to provide in illuminated digital measurement display 40 a number ranging from zero to 20.

Utilizing this basic system, corresponding digital displays may be obtained for other conditions, such as engine temperature, battery current, water levels in radiator and battery, radiator pressure, etc. Likewise, all the digital signals are available for use in simple calculations to produce low-level fuel alarms, high-speed alarms, indications of miles per gallon, or for input eventually into computers for analysis of the vehicle's characteristics or for actual vehicle control.

I claim:

1. A digital instrumentation system for a vehicle, comprising, a first means for producing in an output thereof pulses which vary in frequency according to variations in speed of rotation of a vehicle wheel, second means for producing timing pulses at a fixed rate, third means for comparing the rate of pulses produced by the first means with the rate of pulses produced by the second means, and being operable in one mode for producing in an output thereof a code signal varying in value in accordance with the difference between said rates, fourth means responsive to said code signal for producing an output coded voltage signal varying in accordance with variations in said code signal, fifth means responsive to said variations in said output coded voltage signal for producing a digital display which varies in accordance with variations in said output signal, means responsive to a variable condition of a part of said vehicle for producing an analog voltage signal varying in accordance with said condition, means responsive to said analog voltage signal for producing a signal varying in frequency in accordance with variations in said analog voltage, means for feeding said frequency varying signal to said third means, said third means being operable in another mode for comparing the frequency of said frequency varying signal with the frequency of the pulses produced by said second means and for producing in said output thereof a code signal varying in value with the differences between said frequencies, and means for shifting the operation of said third means from said one mode to said other mode.

2. A digital instrumentation system for a vehicle, comprising, first means including a transducer for producing in an output thereof pulses which vary in frequency in accordance with variations in speed of rotation of a vehicle wheel, second means for producing timing pulses at a fixed rate, third means operable in one mode for comparing the rate of transduced pulses with the rate of the timing pulses and for producing in an output thereof a train of pulses which vary in frequency in accordance with the difference in frequency between said transduced and timing pulses, said third means including adjustable gate means and pulse generators controlled by said timing pulses for producing trigger and reset pulses upon occurrence of a predetermined number of timing pulses, fourth means including a counter for counting the pulses in said train produced by said third means and storage devices for storing the count accumulated in said counter, a digital display device, said counter responding to said reset pulses for restarting the count and said storage devices responding to said trigger pulses for transferring the count last stored therein to said digital display device, a measuring device for producing an analog voltage signal varying in accordance with variations in a condition being measured, and voltage to frequency converting means for producing a signal varying in frequency in accordance with variations in said analog voltage, said third means being operable in another mode for comparing the frequency of said frequency varying signal with the rate of said timing pulses and for producing in said output thereof a train of pulses which vary in frequency in accordance with the difference in the frequency between said frequency varying signal and said timing pulses.